M. MAURER.
QUICK WEIGHING ATTACHMENT FOR SCALES.
APPLICATION FILED JULY 9, 1919.
1,429,362.
Patented Sept. 19, 1922.
2 SHEETS—SHEET 1.
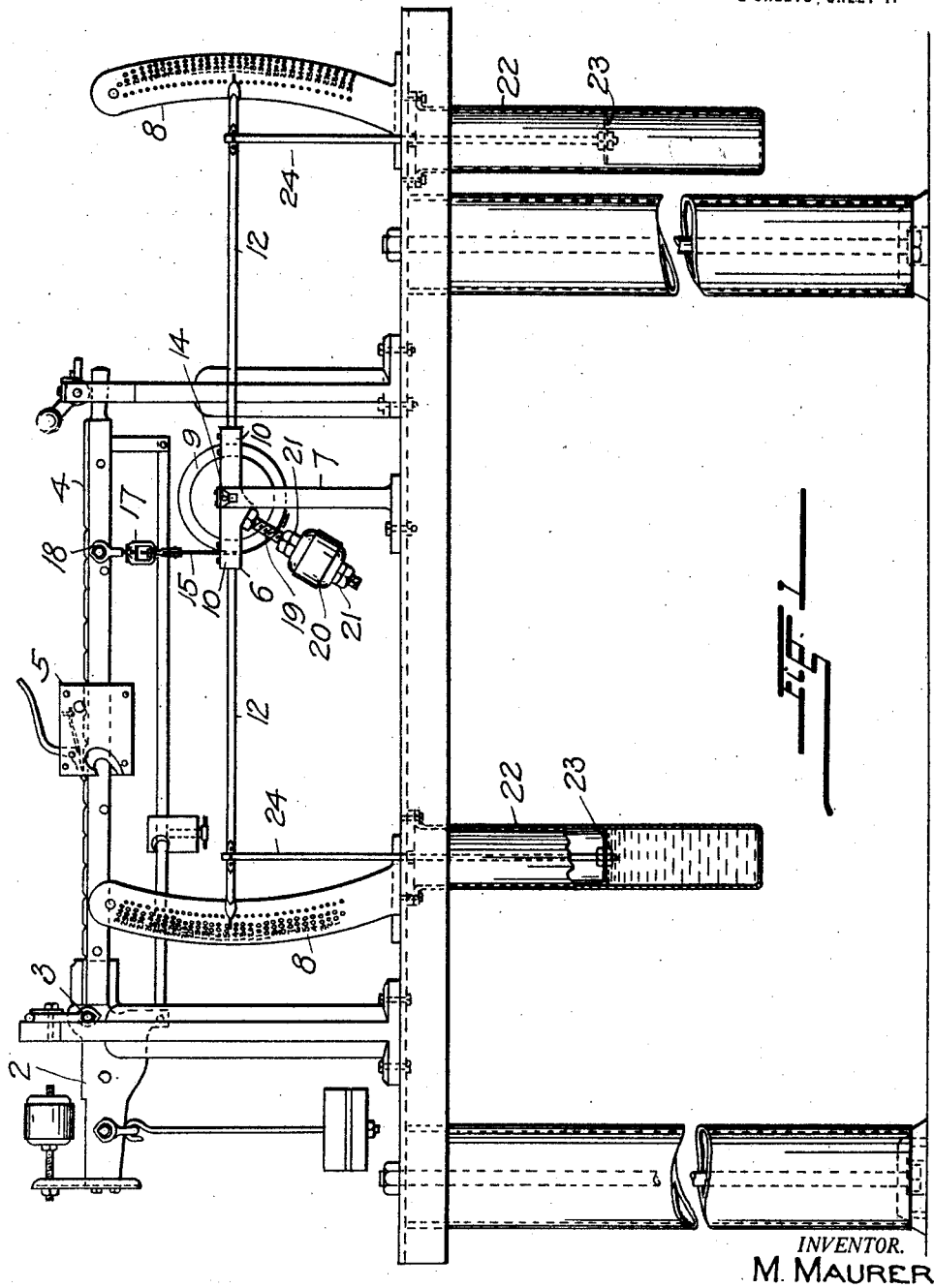
INVENTOR.
M. MAURER
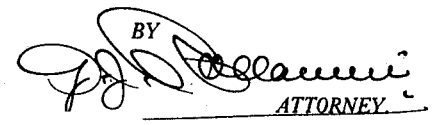
ATTORNEY.

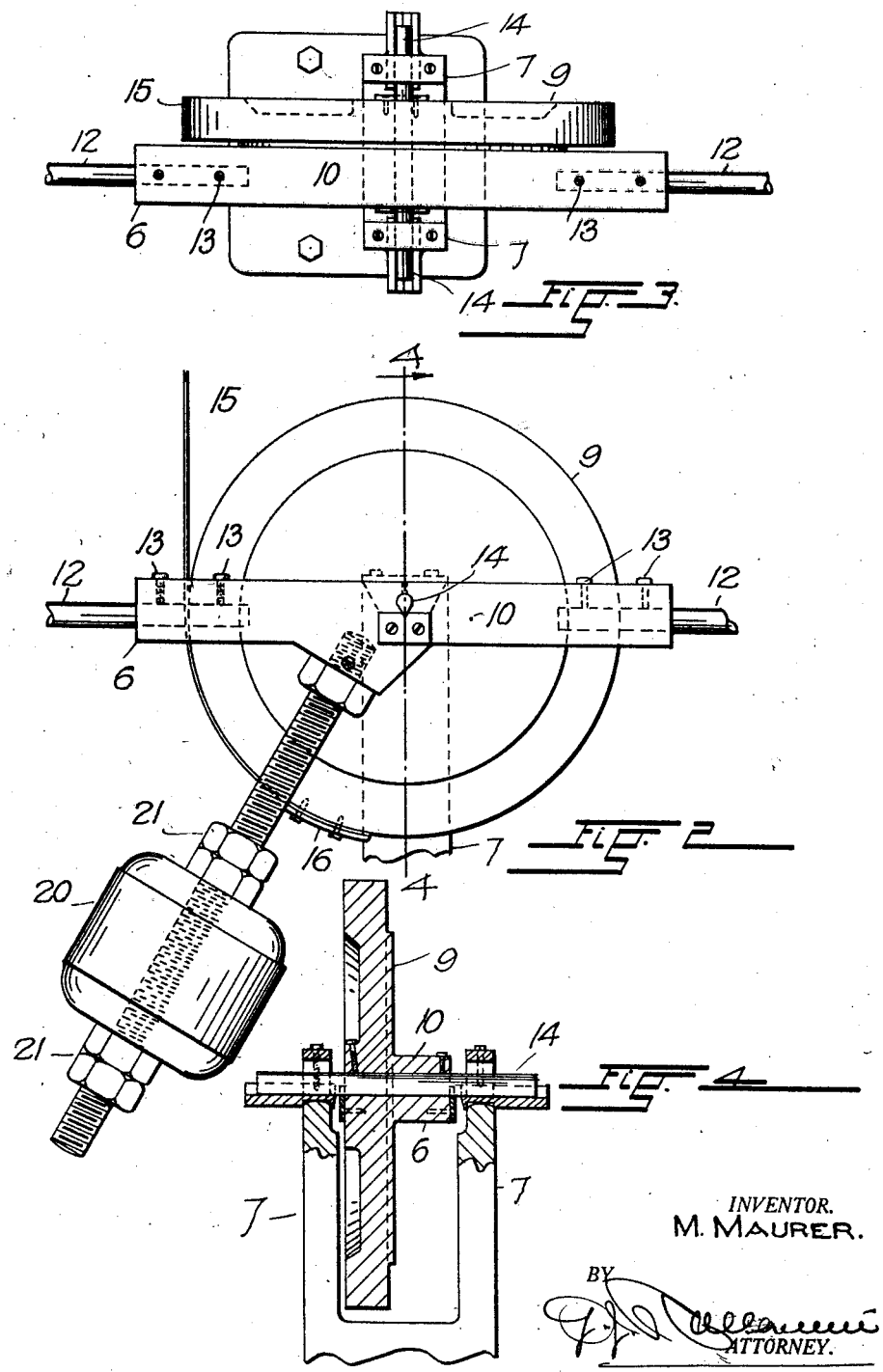

Patented Sept. 19, 1922.

1,429,362

UNITED STATES PATENT OFFICE.

MARTIN MAURER, OF PUEBLO, COLORADO.

QUICK-WEIGHING ATTACHMENT FOR SCALES.

Application filed July 9, 1919. Serial No. 309,678.

*To all whom it may concern:*

Be it known that I, MARTIN MAURER, a citizen of the United States, residing at Pueblo, in the county of Pueblo and State of Colorado, have invented certain new and useful Improvements in Quick-Weighing Attachments for Scales, of which the following is a specification.

This invention relates to quick-weighing attachments for scales, and more particularly to improvements in the weighing attachment shown and described in my Letters-Patent No. 729,376, issued on May 26, 1903.

The attachment above referred to consists of a double-pointed pivoted bar cooperating with two graduated scales and attached to the long arm of a scale beam through the medium of a link.

A coiled spring yieldingly opposes the pivotal movement of the pointer bar in conjunction with the scale beam by the weight of the load, and by its balancing effect, provides a ready means for indicating the weight by the position of the pointers on the scales.

A pair of dash-pots connected with the pivoted pointer-bar cooperate with the spring in balancing the lock on the scale beam and also tend to steady the movement of the bar.

The action of the spring in the above-described mechanism was found to be susceptible to vibration, and it is the primary object of the present invention to provide a device which performs the function of the spring in a more positive manner, which is non-elastic and thus not detrimentally affected by vibration, and which is readily adjustable to maintain the accuracy required in weighing apparatus of the type to which it is applied.

With these objects in view, my invention consists in attaching to the pointer-bar of the weighing attachment, a counter-balancing weight in the form of a pendulum which when the bar is in its idle or zero position, is suspended in the perpendicular.

The bar is connected with the scale-beam through the medium of a flexible strap which passes partially around the periphery of a circular bearing member on the bar and which effects an upward motion of the pendulum when the beam is moved about its fulcrum by the weight of a load placed on the scale.

The pendulum consists of a body which is mounted on a threaded rod projecting laterally from the pointer bar and which is readily adjusted to vary its distance from the pivotal axis of the bar.

An embodiment of my invention has been illustrated in the accompanying drawings in which—

Figure 1 represents a side elevation of a beam scale to which my improved quick-weighing attachment is applied;

Figure 2, a fragmentary, enlarged elevation of the central portion of the pivoted pointer bar, at which the pendulum and its lifting medium are disposed;

Figure 3, a plan view of the parts shown in Figure 2; and

Figure 4, a section taken on the line 4—4, Figure 2.

Referring to the drawings by numerical reference characters, 2 designates the scale beam fulcrumed as at 3 and carrying upon its graduated long arm 4 the usual sliding poise 5.

The quick-weighing attachment consists of the pointer bar 6 which is pivotally supported at its center upon a standard 7.

The bar has at its opposite ends, pointers which cooperate with curved scales 8 graduated in reverse directions to simultaneously indicate the weight of a load on the scale by the movement of the bar.

This double weighing is of advantage where two persons at separated points desire to check each other's observations, as for example, when weighing coal at mines in which the miners are paid by the tonnage they individually produce and the coal is weighed at the time it is removed from the excavation.

It will be understood, however, that the attachment is equally effective if but one pointer is used in cooperation with a single graduated scale.

The pivoted pointer bar is connected with the scale-beam through the intermediary of a wheel 9 placed concentric to its axis of rotation.

The wheel is preferably formed integral with a central portion of the bar made in the form of an elongate block 10 which at its opposite ends has longitudinal openings to receive the ends of pointer rods 12 secured by set-screws 13.

The wheel is secured upon a knife-edged pivoted shaft 14 which rests upon bearings on the standard at opposite sides of the wheel.

A flexible band 15 fastened to the wheel as at 16, passes partially around the periphery thereof and is connected with the long arm of the scale-beam through the medium of a turn-backle 17 which is suspended from a knife-edged stud 18 projecting laterally from the beam.

The pendulum consists of a threaded rod 19 secured to the block 10 and extending obliquely with respect to the longitudinal axis of the pointer bar.

The body 20 of the pendulum has a bore through which the rod passes and is securely held in its adjusted positions between nuts 21 screwed on the rod at opposite sides thereof.

The reference characters 22 designate the dash-pots composed of cylinders which are partially filled with oil or other suitable liquid, and pistons 23 at the ends of rods 24 which are pivotally connected with the pointer bar at opposite sides of its pivotal axis.

In the operation of my invention the pendulum is lifted by the weight of a load on the scale-beam and cooperates with the dash-pots to indicate the weight upon the scales. It will be understood that the attachment acts as an auxiliary to the sliding poise which is moved along the beam to counterbalance the greater part of the weight of the load before the weighing attachment is put into effect.

The graduations on the scales are spaced at progressively varying distances to compensate for the gradually increasing gravitative force of the weight during its upward movement with the scale beam.

The variations in the distances between the graduation are, however, too slight to be perceptible except by minute observation and have not been shown in the drawings.

It will be seen from the above explanation that the improved element of the quick-weighing attachment not only renders its operation more positive and accurate, but also is advantageous over the original construction shown in the before-mentioned patent, by its extreme simplicity of construction, it being understood that but one pivot is required to maintain the entire attachment in its operative position with relation to the scale beam.

It will also be seen that the absence of any elastic part in the construction of the attachment facilitates its operation by permitting of the indicatory member assuming a condition of rest without prolonged vibration.

Having thus described my invention what I claim and desire to secure by Letters-Patent is:

1. In a beam scale of the character described the combination of a fulcrumed scale-beam, a pivoted pointer parallel therewith, a relatively stationary scale cooperating with the pointer, a coaxial segment moving with the pointer, a strap connecting the segment with the beam at a point outside the fulcrum thereof, and a weight acting upon the pointer and relatively disposed to be lifted by movement of the scale-beam under the influence of the load.

2. In a beam scale of the character described the combination of a fulcrumed scale-beam, a pivoted pointer beneath the beam in parallel relation thereto, a relatively stationary scale cooperating with the pointer, a coaxial segment moving with the pointer, a strap connecting the segment with the beam at a point outside the fulcrum thereof, and a weight acting upon the pointer and relatively disposed to be lifted by movement of the scale-beam under the influence of the load.

3. In a beam scale of the character described the combination of a fulcrumed scale-beam, a pivoted pointer parallel therewith, a relatively stationary scale cooperating with the pointer, a coaxial segment moving with the pointer, a strap connecting the segment with the beam at a point outside the fulcrum thereof, a dash pot operatively connected with the pointer, and a weight acting upon the pointer and relatively disposed to be lifted by movement of the scale-beam under the influence of the load.

In testimony whereof I have affixed my signature.

MARTIN MAURER.